(12) United States Patent
Doll (10) Patent No.: US 11,446,985 B2
(45) Date of Patent: Sep. 20, 2022

(54) AIR VENT

(71) Applicant: Faurecia Innenraum Systeme GmbH, Hagenbach (DE)

(72) Inventor: Volker Doll, Ranschbach (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 399 days.

(21) Appl. No.: 16/502,373

(22) Filed: Jul. 3, 2019

(65) Prior Publication Data
US 2020/0009945 A1 Jan. 9, 2020

(30) Foreign Application Priority Data
Jul. 4, 2018 (DE) ...................... 10 2018 211 057.3

(51) Int. Cl.
*B60H 1/34* (2006.01)

(52) U.S. Cl.
CPC .................. *B60H 1/3421* (2013.01)

(58) Field of Classification Search
CPC ...... B60H 1/3421; B60H 1/3414; B60H 1/34; B60H 2001/3471; B60H 2001/3478
USPC ....................................................... 454/155
See application file for complete search history.

(56) References Cited

U.S. PATENT DOCUMENTS

| 5,186,387 | A  | * | 2/1993 | Doi | .................... | B60H 1/00871 |
| | | | | | | 236/49.3 |
| 6,179,707 | B1 | * | 1/2001 | Arold | ................... | B60H 1/3407 |
| | | | | | | 454/150 |
| 6,881,139 | B2 | * | 4/2005 | Yang | .................... | B60H 1/3421 |
| | | | | | | 454/155 |
| 2016/0114654 | A1 | * | 4/2016 | Lee | ..................... | B60H 1/3414 |
| | | | | | | 454/155 |

(Continued)

FOREIGN PATENT DOCUMENTS

| DE | 102013210053 B3 | 9/2014 |
| DE | 102013210055 B3 | 9/2014 |

(Continued)

OTHER PUBLICATIONS

"German Application Serial No. 10 2018 211 057.3, Examination Report dated Feb. 27, 2019", (Feb. 27, 2019), 7 pgs.

*Primary Examiner* — Avinash A Savani
*Assistant Examiner* — Dana K Tighe
(74) *Attorney, Agent, or Firm* — Schwegman Lundberg & Woessner, P.A.

(57) ABSTRACT

The invention relates to an air vent, comprising a first air channel, a second air channel, an air regulating flap pivotable around a flap axis for adjusting a ratio between a first airflow through the first air channel and a second airflow through the second air channel, wherein the air regulating flap closes the first air channel in a first position and the air regulating flap closes the second air channel in a second position. A plurality of first vanes are disposed at least (Continued)

partially in the first air channel, wherein each of the first vanes is pivotable around a first vane axis. A plurality of second vanes are disposed at least partially in the second air channel, wherein each of the second vanes is pivotable around a second vane axis. A manipulator can coupled to the first vanes, the second vanes and the air regulating flap such as for adjusting the first vanes, the second vanes and the air regulating flap.

9 Claims, 10 Drawing Sheets

(56) References Cited

U.S. PATENT DOCUMENTS

2016/0375746 A1 * 12/2016 Ahn ..................... B60H 1/3421
454/155

FOREIGN PATENT DOCUMENTS

DE 102016116356 A1 * 3/2018 ........... B60H 1/3421
DE 102015017009 B4 4/2018

* cited by examiner

Fig. 11 ns that can be susceptible to faults.
AIR VENT

CLAIM FOR PRIORITY

This application claims the benefit of priority of German Application No. DE 10 2018 211 057.3, filed Jul. 4, 2018, which is hereby incorporated by reference in its entirety.

TECHNICAL FIELD

This application relates to an air vent with which in particular an air outflow direction can be adjusted in a vertical and lateral direction.

BACKGROUND

Various air vents are known from the prior art. For example, the following publications disclose air vents: DE 10 2013 210 055 B3, DE 10 2013 210 053 B3 and DE 10 2016 116 356 A1.

SUMMARY

In air vents it is advantageous if the outflow direction of an airflow flowing out through the air vent can be controlled. To this end, movable vanes, which can also be referred to as lamellas, can be arranged in an air channel of the air vent. The vanes can be oriented by being pivoted around an axis, whereby the airflow can be directed in a specific direction.

The air vents described in the above-mentioned publications in the above Background portion of this document have relatively complex designs with many components, and as a result they can be susceptible to faults.

An air vent is proposed which can comprise
a first air channel,
a second air channel, and
an air regulating flap pivotable around a flap axis for setting a ratio between a first airflow through the first air channel and a second airflow through the second air channel, wherein the air regulating flap closes the first air channel in a first position and the air regulating flap closes the second air channel in a second position.

The air vent can additionally comprise
a plurality of first vanes, which are arranged at least partially in the first air channel, wherein each of the first vanes is pivotable around a first vane axis,
a plurality of second vanes, which are arranged at least partially in the second air channel, wherein each of the second vanes is pivotable around a second vane axis, and
a manipulator coupled to the first vanes, the second vanes and the air regulating flap for adjusting the first vanes, the second vanes and the air regulating flap.

The air vent can provide a design that can be relatively simple to make and use. The air regulating flap is typically movable between the first and the second position, wherein the first air channel is completely closed by the air regulating flap in the first position, and wherein the second air channel is completely closed by the air regulating flap in the second position. In intermediate positions between the first position and the second position, the airflow entering the air vent is divided into two by the air regulating flap into the first airflow and the second airflow. In a specific intermediate position, the ratio can be selected such that the first airflow through the first air channel and the second airflow through the second air channel are of the same size. The first air channel is typically disposed above the second air channel in the vertical direction. By pivoting the air regulating flap, it is thus possible to influence the distribution of the air flowing out from the air vent in the vertical direction. Usually, only a single air regulating flap is provided, whereby the air vent can have a particularly simple design.

With the aid of the first vanes and the second vanes, a lateral direction of the air flowing out from the air vent can be modified, depending on the orientation of the first vanes and the second vanes. The lateral air outflow direction can be influenced for example in a horizontal plane perpendicularly to the vertical outflow direction by adjustment of the vanes.

Since the manipulator is coupled to the first vanes, the second vanes and the air regulating flap and is designed to adjust them, it is possible to modify the directional characteristics of an exiting airflow in the vertical and lateral direction by means of a single manipulator.

In an embodiment the manipulator is displaceable in a direction parallel to the flap axis. A displacement of the manipulator can bring about a pivoting movement of the first and the second vanes, whereby the lateral air outflow direction is altered. Here, the displacement is for example a movement in translation in the lateral direction, for example to the left or right.

The air vent can have a coupling member which connects the first vanes and the second vanes to the manipulator. The coupling member can have a first end, a second end, and an intermediate piece disposed therebetween. In one embodiment the first end of the coupling member is connected to the first vanes, the intermediate piece of the coupling member is connected to the second vanes, and the second end of the coupling member opposite the first end is connected to the manipulator. It can be provided that the coupling member is connected to just one of the first vanes and/or to one of the second vanes. In this case the first vanes can be connected to one another via a first joint coupling element so as to enable a synchronous movement of the first vanes with the aforementioned one first vane. It may likewise be provided that the second vanes are connected to one another via a second joint coupling element in such a way that all second vanes are rotatable simultaneously.

The coupling member can be connected in different ways to the first vane or to the first vanes. For example, the first end of the coupling member comprises a first guide groove, in which a first pin engages. The first pin is rigidly connected to the first vane or to the first vanes, for example via a lever arm. In this way, the displacement in translation of the manipulator in the lateral direction can be converted via the coupling member into a rotary or pivoting motion of the first vanes. Similarly, the intermediate piece of the coupling member can have a second guide groove, in which a second pin engages. The second pin is rigidly connected via a lever arm to one of the second vanes or to the second vanes.

In an embodiment the manipulator is rotatable around a manipulator axis. A rotation of the manipulator around the manipulator axis can bring about a pivoting motion of the air regulating flap around the flap axis. In one variant a downwardly or upwardly directed rotary movement of the manipulator brings about a downwardly or upwardly directed pivoting motion of the air regulating flap. The manipulator axis and the flap axis are oriented parallel to one another in one embodiment.

The air vent can have a coupling rod, which is arranged between the manipulator and the air regulating flap and is connected thereto. For example, a first lever arm and a second lever arm are provided, wherein the first lever arm is rigidly connected to the air regulating flap and is coupled articulatedly to the coupling rod, and wherein the second lever arm is rigidly connected to the manipulator and is coupled articulatedly to the coupling rod.

The first vanes and the second vanes are mounted for example rotatably on first vane shafts and second vane shafts respectively. The vane shafts and the second vane shafts can be connected to the above-described coupling member. The first vane axis runs generally centrally through the first vane shaft, and the second vane axis runs generally centrally through the second vane shaft. The first vane shafts or vane axes are preferably parallel to one another. Furthermore, the second vane shafts or vane axes can be oriented parallel to one another. In addition, the first vane shafts or first vane axes and the second vane shafts or second vane axes can be oriented parallel to one another. The first vane axis and/or the second vane axis can be oriented perpendicularly to the flap axis and/or perpendicularly to the manipulator axis. In one embodiment of the air vent the first vanes are arranged above the air regulating flap and the second vanes in the vertical direction.

In a further variant the first air channel and the second air channel are separated from one another by a separation element. The separation element is preferably connected rigidly to a housing of the air vent. Usually, the first air channel and the second air channel meet one another upstream before the separation element. The region further upstream—that is to say before the airflow is divided into two into a first airflow and a second airflow—can be referred to as an air inlet opening. The air regulating flap can be arranged at an end of the separation element facing the air inlet opening. The separation element usually forms an upper delimitation for the second air channel and a lower delimitation for the first air channel. The separation element optionally has a shape tapering in the direction of the air inlet opening. Furthermore, the separation element can have a cavity. In one embodiment the manipulator, the coupling member and/or the coupling rod are arranged in the cavity of the separation element at least in some regions. The separation element thus can not only form a guide for the airflows and the division of the airflows in the two channels, but also a housing for the manipulator of the coupling member and the coupling rod.

In an embodiment the first vane axes lie in a first plane. The second vane axes can lie in a second plane, wherein the first plane and the second plane differ from one another. The first plane and the second plane are preferably parallel to one another. The first plane and the second plane can additionally be parallel to the flap axis. Furthermore, the first vanes can be arranged between the air regulating flap and the second vanes in the flow direction.

In an embodiment the first air channel and the second air channel are of different lengths. In particular, they can have different lengths in the flow direction. Furthermore, the first vanes can be arranged closer to the above-mentioned air inlet opening than the second vanes.

All or individual or several of the above-mentioned parts can be produced by an injection moulding process. For example, the air regulating flap, the first vanes, the second vanes, the manipulator, the coupling member, the coupling rod, the aforesaid lever arms, the first vane shafts, the second vane shafts, the aforesaid coupling elements, the guide grooves, the pins and the separation element are injection-moulded parts, for example made of thermoplastic or thermoset materials.

Furthermore, a vehicle interior trim part is proposed, which comprises an air vent according to any one of the preceding embodiments. The air vent is thus suitable in particular for installation in vehicle interiors. Here, the air vent can be fluidically connected to a fan, a heater or an air-conditioning unit and can be arranged after (downstream of) one of these elements.

It goes without saying that the above-described embodiments can be combined with one another in any way, provided the combinations are not mutually exclusive.

Embodiments of the invention will be explained in greater detail hereinafter with reference to accompanying drawings. Here, the drawings are schematic and partially simplified. They show.

Elements similar to one another will be denoted hereinafter by the same reference signs.

Reference is made hereinafter firstly to FIGS. 1 to 4.

FIGS. 1 to 4 show different views of an air vent 1. The air vent 1 is part of a vehicle interior trim part and comprises a housing 33 and a separation element 30 arranged rigidly in relation to the housing 33. A first air channel 2 and a second air channel 3 are formed between the housing 33 and the separation element 30. In addition, the air vent 1 has an air inlet opening 29, which can be fluidically connected to a fan (not shown) or an air-conditioning unit (not shown) or heater. An airflow coming through the air inlet opening 29 is conducted through the first air channel 2 and/or the second air channel 3, after which it is then conducted into the vehicle interior (not shown). An air regulating flap 4 is fastened to an end of the separation element 30 facing the air inlet opening 29, and is pivotable around a flap axis 5. If the air regulating flap 4 is pivoted fully downward, the second air channel 3 is closed, whereby the entire airflow moves through the first air channel 2. Conversely, if the air regulating flap 4 bears fully upwardly against the housing 33, the first air channel 2 is closed, whereby the entire airflow is conducted through the second air channel 3. A ratio between a first airflow through the first air channel 2 and a second airflow through the second air channel 3 can thus be adjusted by means of the air regulating flap 4. By not pivoting the air regulating flap fully upwardly or fully downwardly, the ratio between the first airflow and the second airflow can be set arbitrarily.

A plurality of first vanes 6 is arranged in the first air channel 2. In addition, a plurality of second vanes 8 is arranged in the second air channel 3. Each of the first vanes 6 is mounted pivotably around a first vane axis 7, and each of the second vanes 8 is arranged pivotably around a second vane axis 9. The first vanes 6 and the second vanes 8 are arranged on first vane shafts 18 and second vane shafts 19. As the vane shafts 18 and 19 rotate, the first vanes 6 and the second vanes 8 are rotated about their vane axes 7 and 9 in the air channels 2 and 3. It is thus possible to influence the movement direction of the first airflow through the first air channel 2 and the second airflow through the second air channel 3 in the lateral direction.

In order to pivot the air regulating flap 4, the first vanes 6 and the second vanes 8 about their respective axes 5, 7 and 9, a manipulator 10 coupled to the first vanes 6, the second vanes 8 and the air regulating flap 4 is provided, by means of which the first vanes 6, the second vanes 8, and the air regulating flap 4 can be adjusted.

The adjustment of the first vanes 6 and the second vanes 8 will be discussed first hereinafter.

Figure 1:
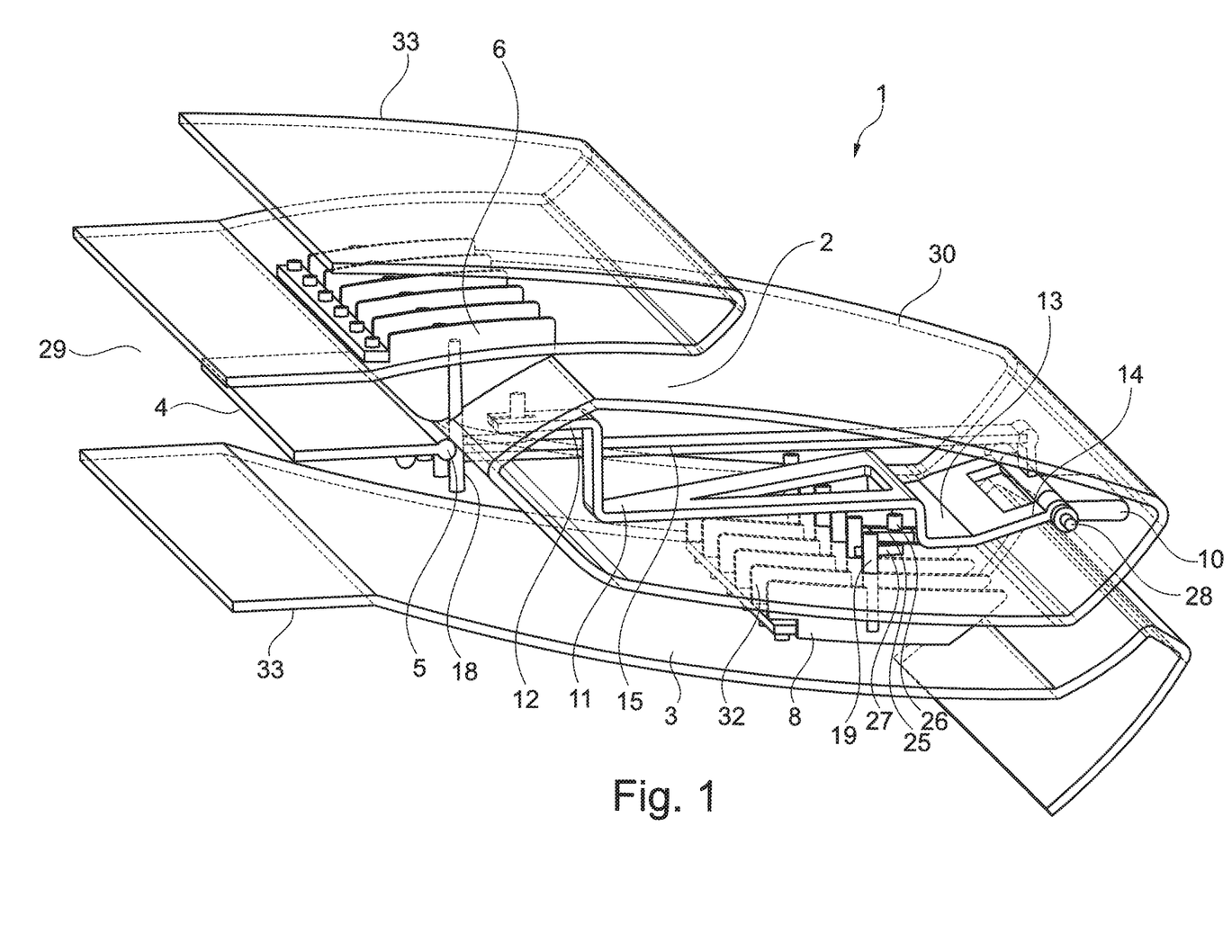
FIG. 1 a schematic depiction of a perspective view of an air vent.
Figure 2:
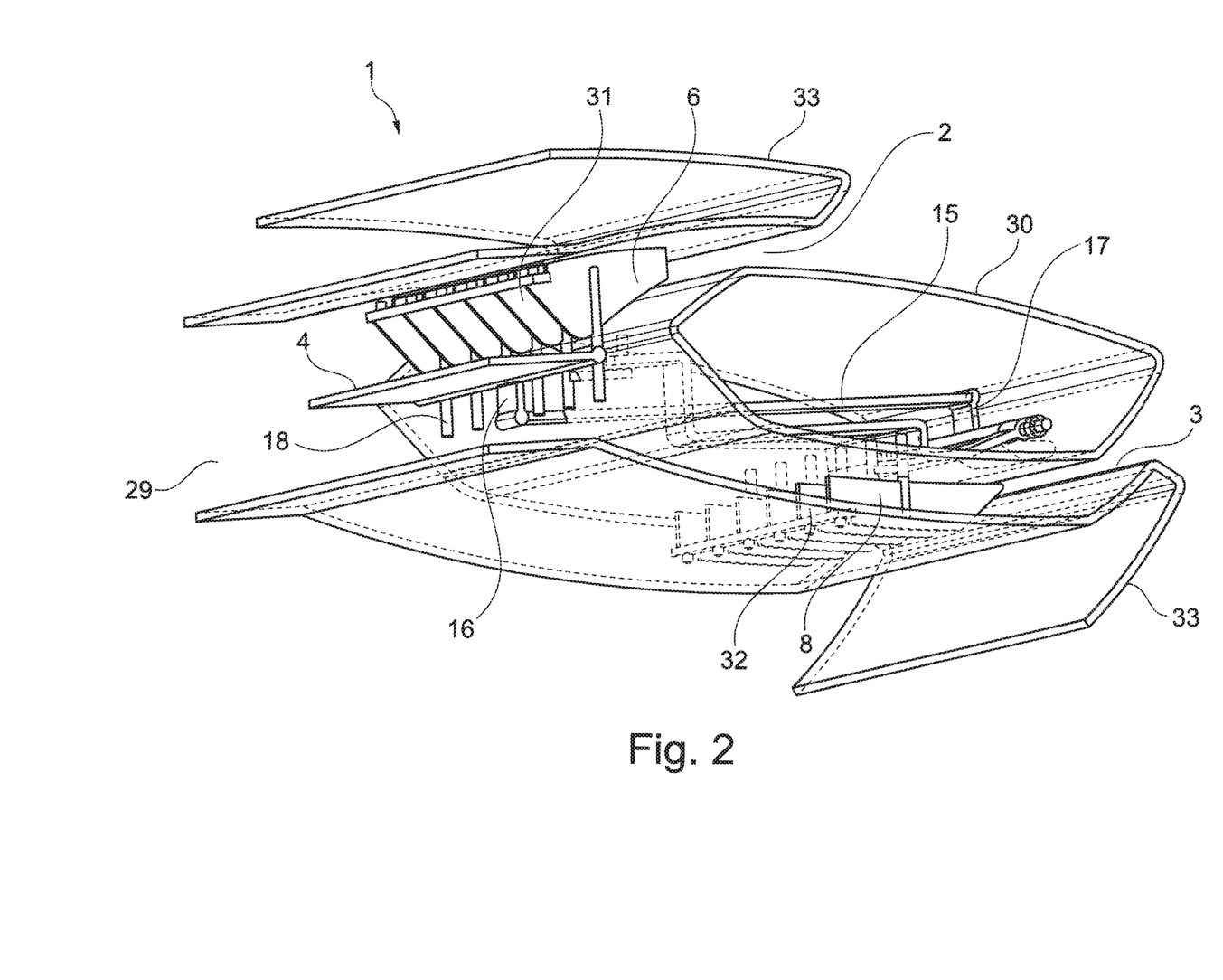
FIG. 2 a further view of the air vent of FIG. 1.
Figure 3:
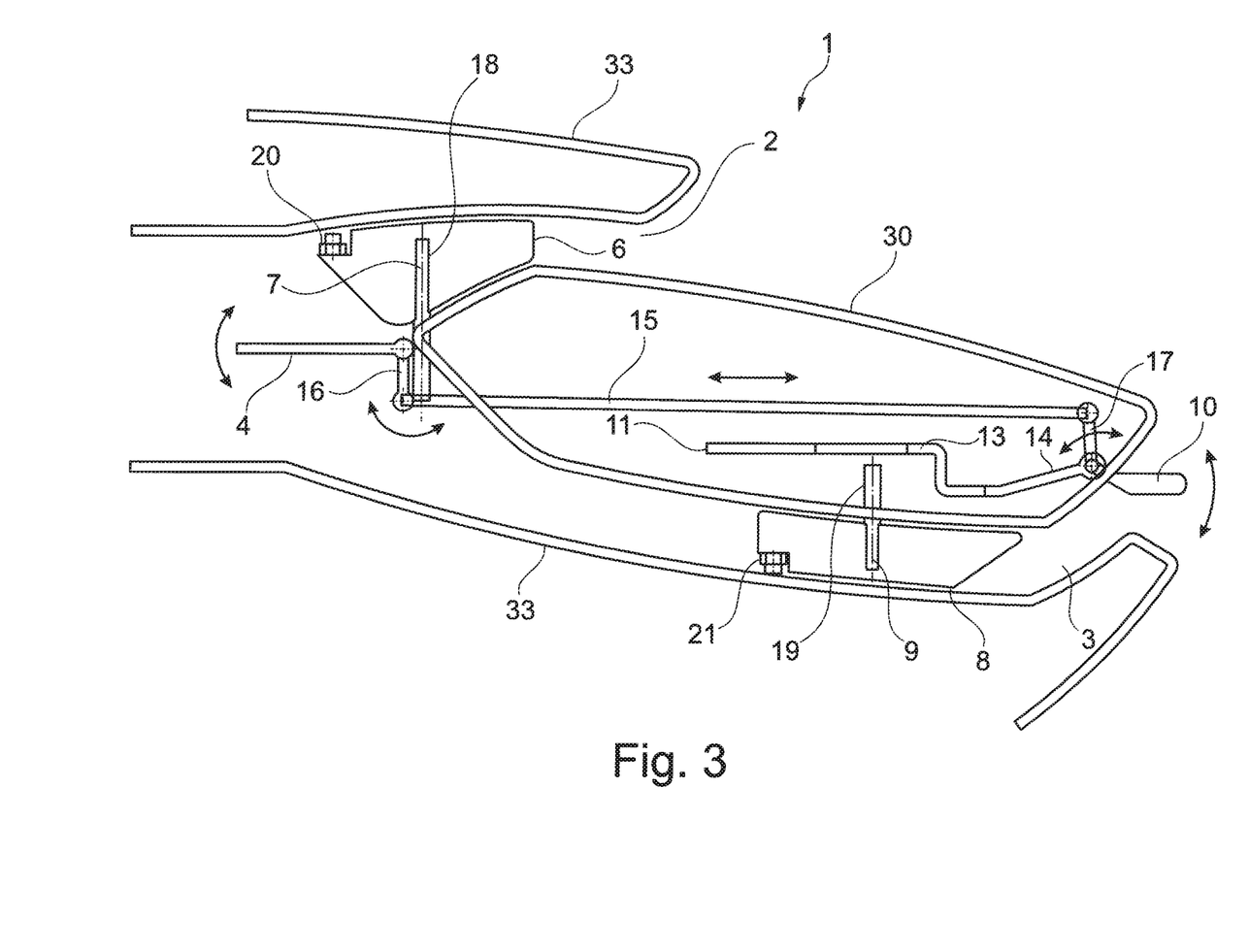
FIG. 3 a cross-section of the air vent of FIGS. 1 and 2.
Figure 4:
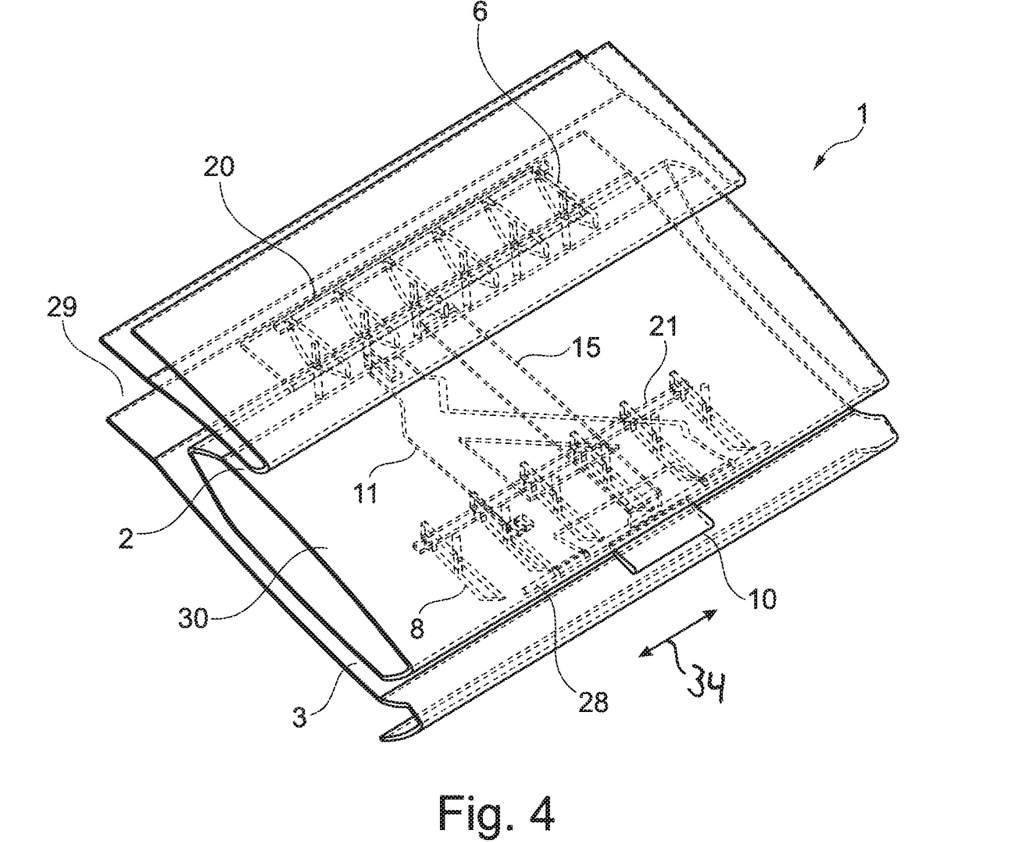
FIG. 4 a plan view of the air vent of FIGS. 1 to 3.
Figure 5:
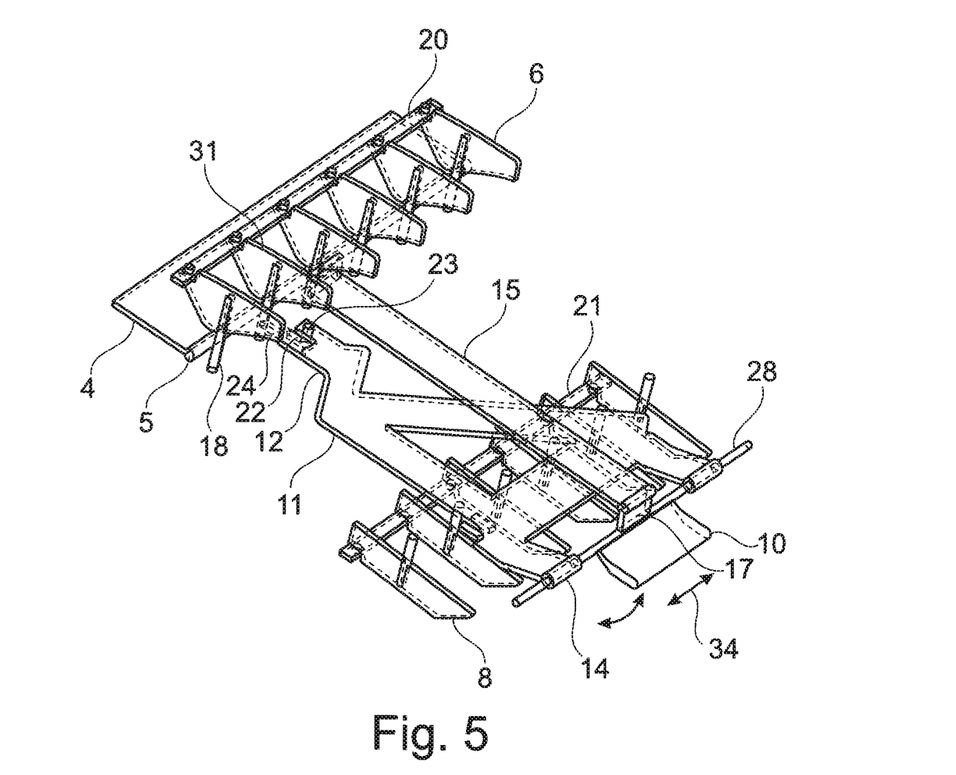
FIG. 5 individual elements of the air vent of FIGS. 1 to 4.
Figure 6:
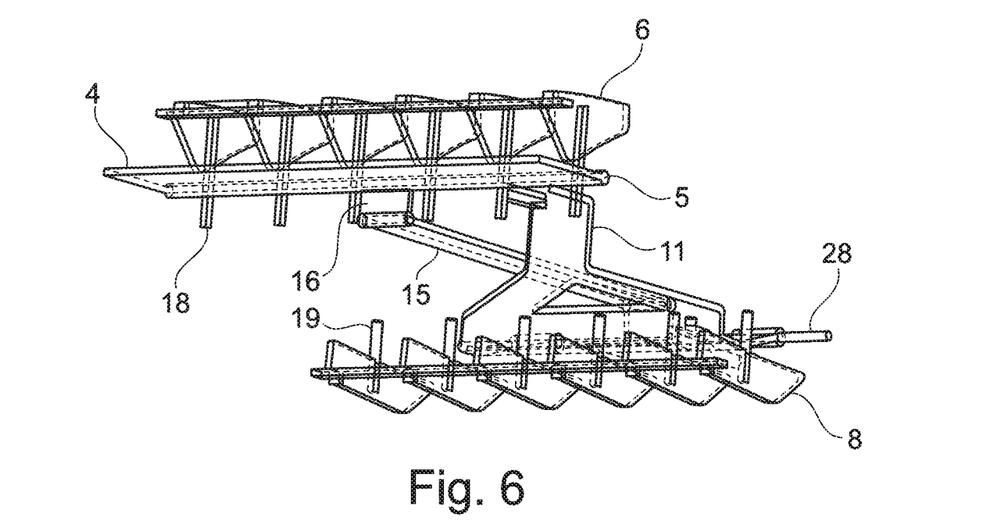
FIG. 6 a further view of the elements of FIG. 5.
Figure 7:
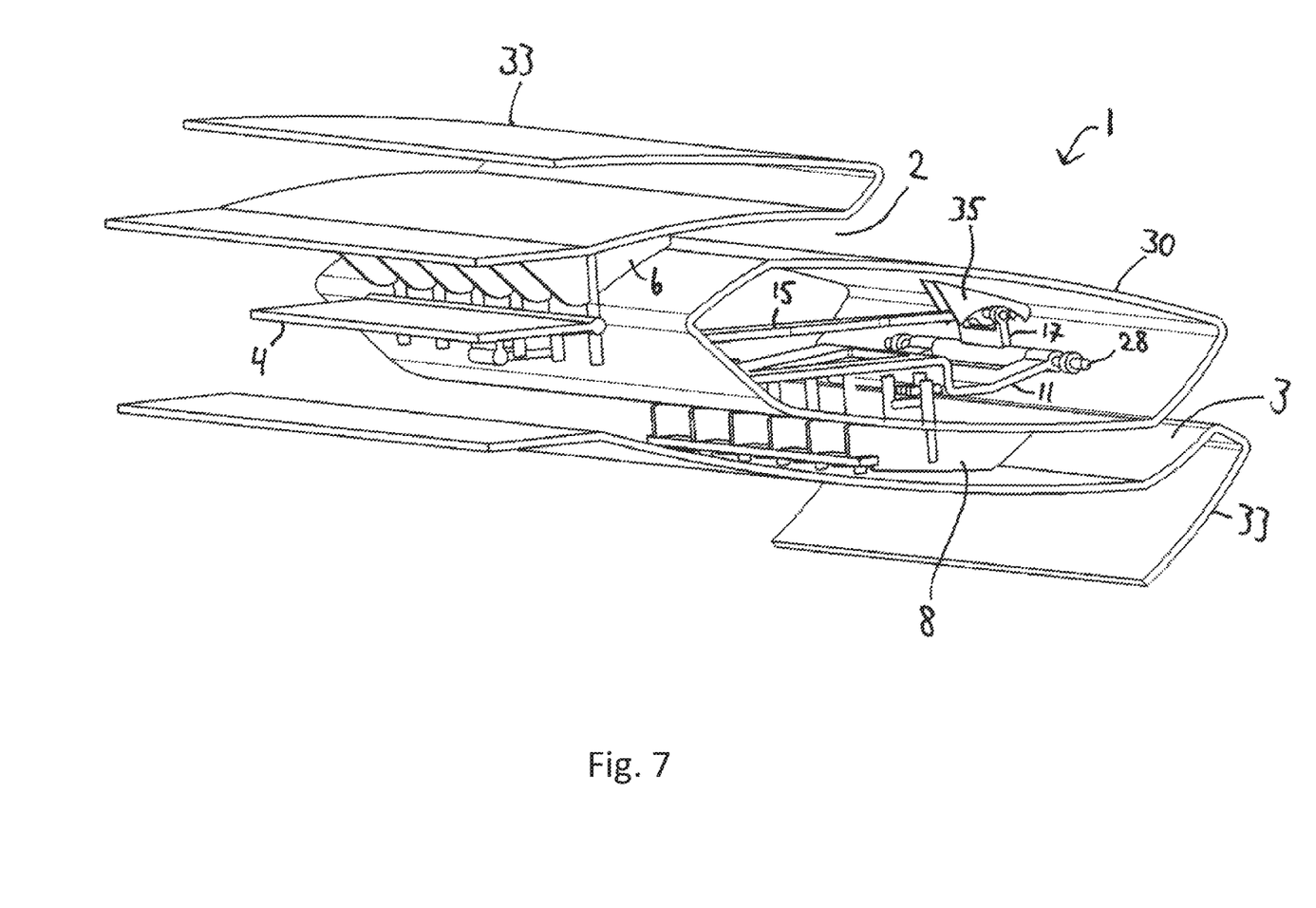
FIG. 7 a further depiction of the air vent.
Figure 8:
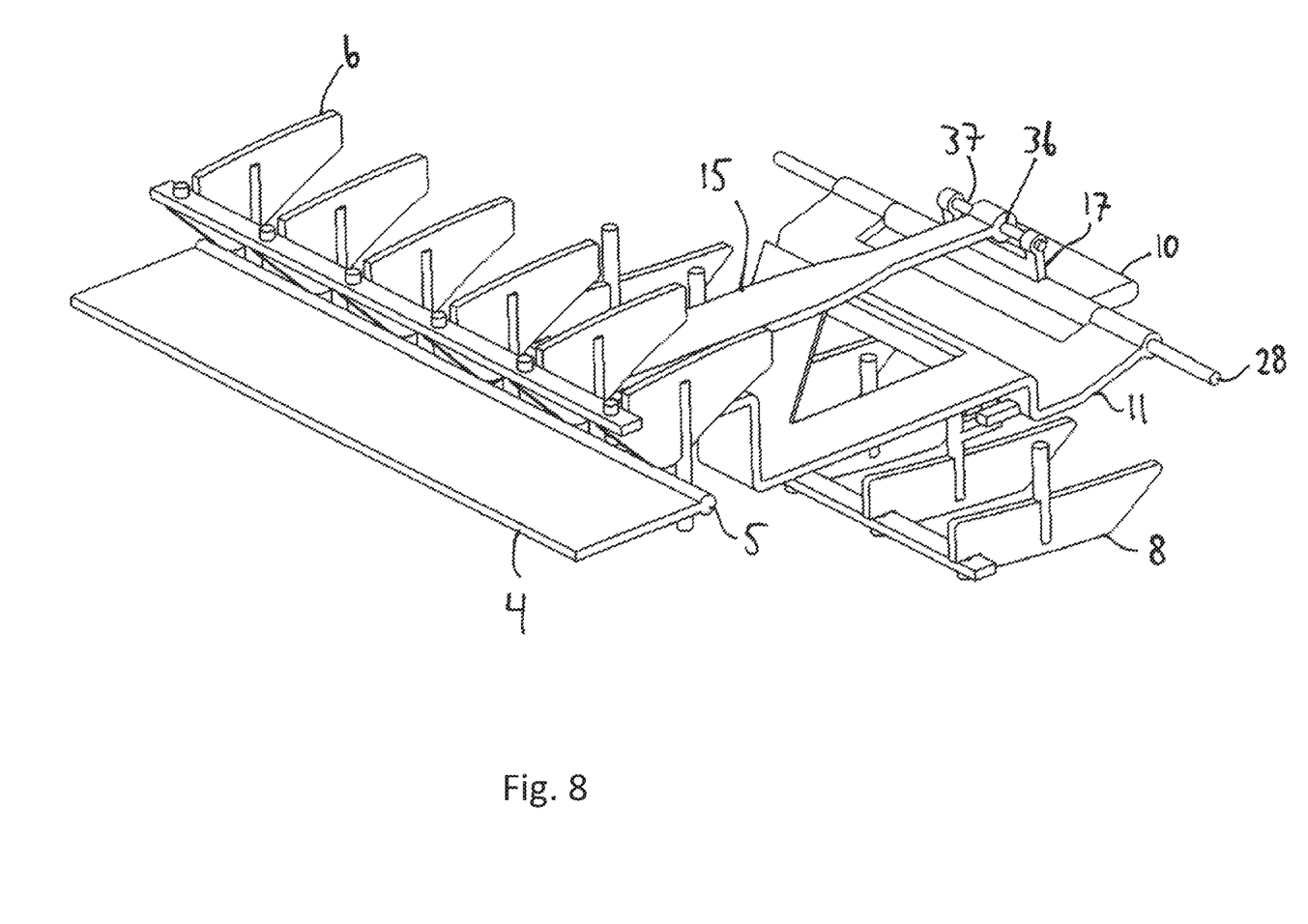
FIG. 8 a further view of the elements of FIGS. 5 and 6.
Figure 9:
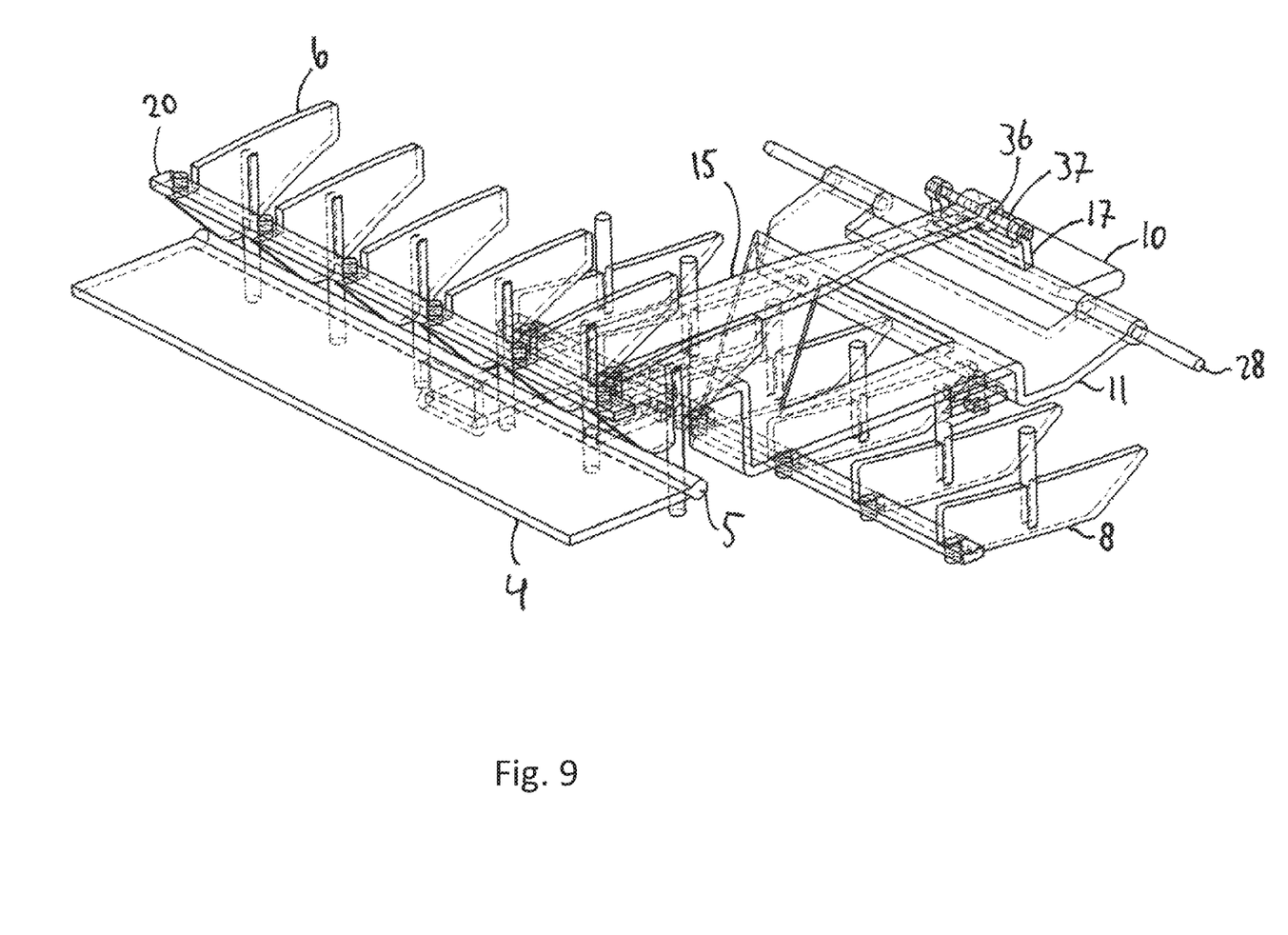
FIG. 9 a further view of the elements of FIGS. 5, 6 and 8.
Figure 10:
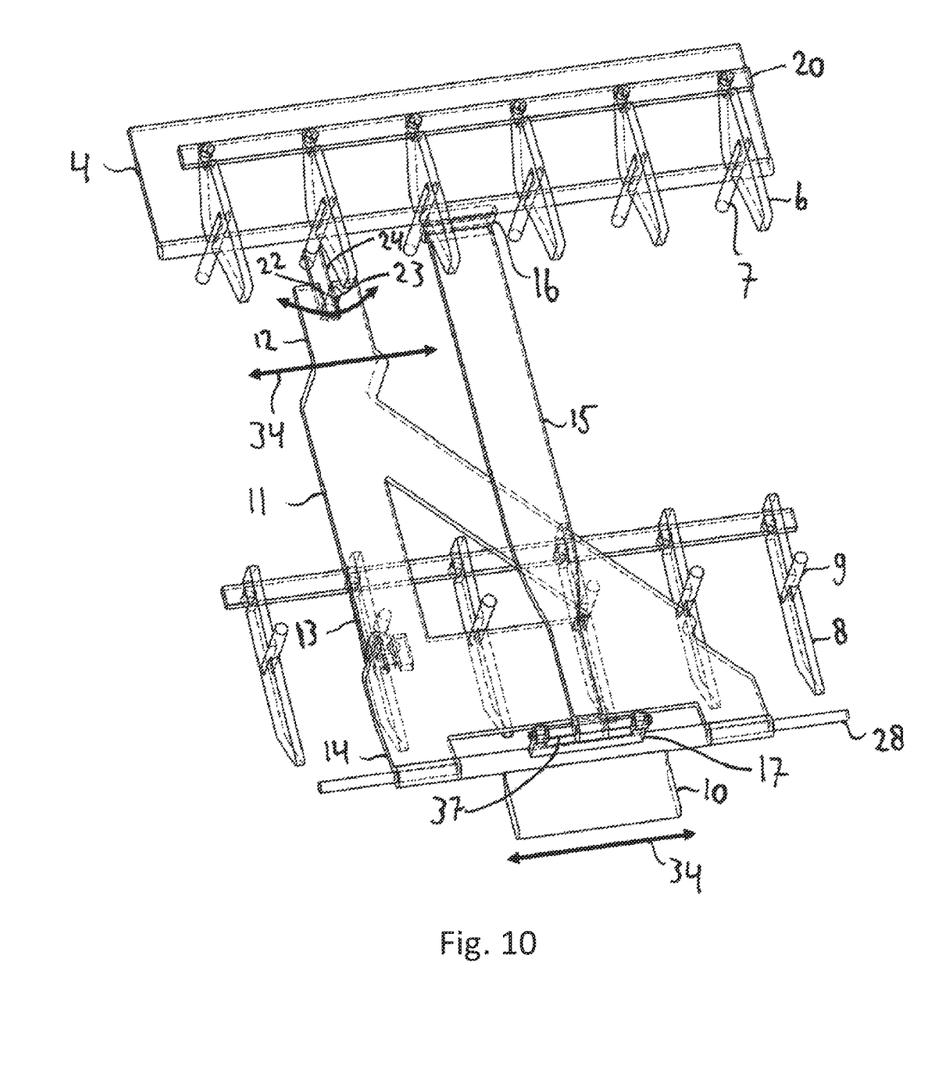
FIG. 10 a further view of the elements of FIGS. 5, 6, 8 and 9.
Figure 11:
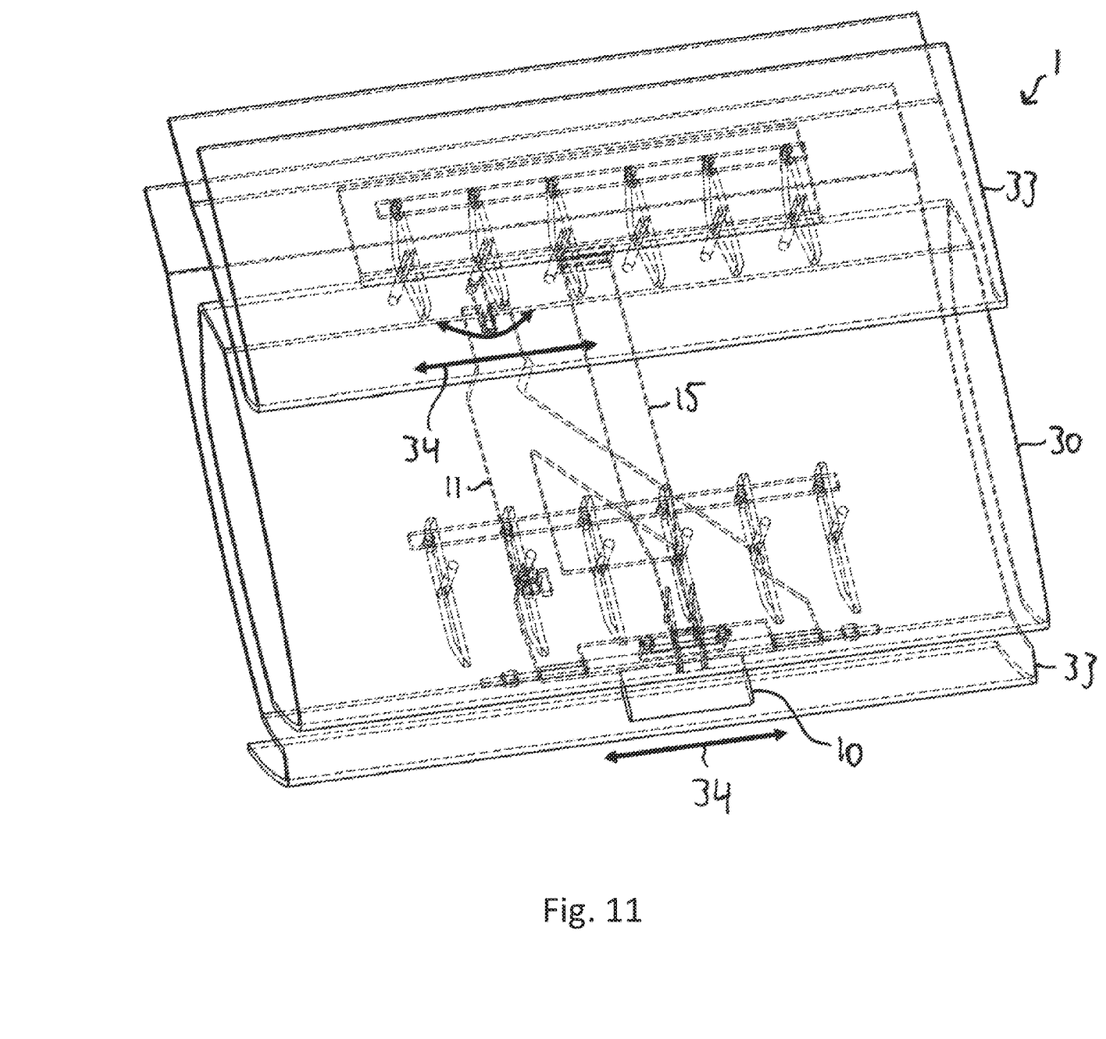
FIG. 11 a further view of the air vent.

The manipulator 10 is displaceable in a direction 34 parallel to the flap axis 5, wherein a displacement of the manipulator 10 brings about a pivoting motion of the first vanes 6 and the second vanes 8. The displacement is performed typically in a lateral direction 34. The manipulator 10 is rigidly connected to a coupling member 11 in the lateral (horizontal) direction 34. The coupling member 11 connects the first vanes 6 and the second vanes 8 to the manipulator 10. Here, a first end 12 of the coupling member is connected to the first vanes 6, an intermediate piece 13 of the coupling member 11 is connected to the vanes 8, and a second end 14 of the coupling member 11 is connected to the manipulator 10. The first end 12 of the coupling member 11 comprises (as can also be seen in FIGS. 5 and 6) a guide groove 22, in which a pin 23 engages, wherein the pin 23 is rigidly connected to a vane 31 of the first vanes 6 via a lever arm 24. Since the first vanes 6 are connected to one another via a first joint coupling element 20, the first vanes 6 can be pivoted simultaneously by the same angle. The intermediate piece 13 of the coupling member 11 comprises a second guide groove 25, in which a second pin 26 engages. The second pin 26 is connected rigidly to a vane 32 from the group of second vanes 8 via a further lever arm 27. The second vanes 8 are likewise connected to one another via a second joint coupling element 21, in such a way that the second vanes 8 are rotatably synchronously by the same angle. Thus, if one of the vanes 6 or one of the vanes 8 moves, the other vanes 6 or 8 also move as well. With the aid of the coupling member 11, a movement in translation of the manipulator 10 in the lateral direction 34 can be converted into a pivoting motion of the vanes 6 and the vanes 8 (see also FIGS. 10 and 11). In the event of a displacement of the manipulator, the first vanes 6 and the second vanes 8 are thus pivoted simultaneously and synchronously in the same direction. If the manipulator 10 is shifted to the left or right, the tips of the vanes 6 and the vanes 8 disposed downstream likewise move to the left or right.

The pivoting motion of the air regulating flap 4 by the manipulator 10 will be described hereinafter. To this end, reference is made additionally to FIGS. 7-11. The air vent 1 of FIGS. 7-11 differs from the air vent 1 of FIGS. 1-6 fundamentally in that the coupling of the manipulator 10 to the air regulating flap 4 is shown in greater detail.

The manipulator 10 is rotatable around a manipulator axis 28, wherein a rotation of the manipulator 10 around the manipulator axis 28 brings about a pivoting motion of the air regulating flap 4 around the flap axis 5. In one embodiment the manipulator axis 28 is parallel to the flap axis 5. A downwardly or upwardly directed rotary motion of the manipulator 10 can bring about, respectively, a downwardly or upwardly directed pivoting motion of the air regulating flap 4 around the flap axis 5.

In one embodiment a coupling rod 15 is arranged between the manipulator 10 and the air regulating flap 4 and is connected thereto. The coupling rod 15 is coupled to a first lever arm 16 and a second lever arm 17 articulatedly. Here, the first lever arm 16 is rigidly connected to the air regulating flap 4 and the second lever arm 17 is rigidly connected to the manipulator 10. Whereas one end of the second lever arm 17 is connected rigidly to the manipulator 10, a second end is connected to the coupling rod 15 articulatedly and displaceably parallel to the axis of rotation. This is clear in particular from the detailed depiction of the coupling of the manipulator 10 to the coupling rod 15 of FIGS. 7 to 11. The coupling rod 15 for example can have a cylindrical recess 36 at one end, through which recess there runs a rod 37 connected to the lever arm 17. The rod 37 can be slid freely back and forth in the recess 36 in the lateral direction. By means of the described transfer of force, a pivoting of the manipulator 10 around the manipulator axis 28 can be converted into a pivoting motion of the air regulating flap 4 in the same direction around the flap axis 5. At the same time, a movement in translation of the manipulator 10 is prevented from pushing the coupling rod 15 sideward in a lateral direction 34. A lateral fixing 35, which is provided in the cavity of the separation element 30 and is rigidly connected to the separation element 30, can contribute to fixing the coupling rod 15 laterally.

It is additionally clear from FIGS. 1-11 that the first vanes 6 are rotatable around first vane axes 7 and the second vanes 8 are rotatable around second vane axes 9. Here, the first vane axes run centrally through the first vane shafts 18, and the second vane axes 9 run centrally through the second vane shafts 19. The first vane axes 7 are each parallel to one another. In addition, the second vane axes 9 are each parallel to one another. In addition, the first vane axes 7 and the second vane axes are oriented parallel to one another. The first vane axes 7 lie in a first plane and the second vane axes 9 lie in a second plane. The first plane and the second plane are parallel to one another and parallel to the flap axis 5 in this embodiment. It is also clear from FIGS. 1-11 that the first plane and the second plane differ from one another. Furthermore, the first vanes 6 are arranged between the air regulating flap 4 and the second vanes 8 in the flow direction. In other embodiments it can also be provided that the second vanes are arranged between the air regulating flap 4 and the first vanes in the flow direction.

The first air channel 2 and the second air channel 3 are of different lengths in the shown exemplary embodiment. In particular, the first air channel is shorter than the second air channel 3 in the flow direction. In other exemplary embodiments the second air channel 3 can also be shorter than the first air channel 2. The aforementioned first plane and the second plane are also oriented parallel to one another.

It can additionally be seen in FIGS. 1-11 that the first vanes 6 are arranged above the air regulating flap 4 and the vanes 8 in the vertical direction. The first vane shafts 18 are mounted rotatably on the separation element 30, wherein the second vane shafts 19 are likewise mounted rotatably on the separation element 30. In another embodiment the first vanes 6 and/or the second vanes 8 are mounted rotatably on the housing 33. The separation element 30 comprises a cavity, in which different elements of the adjustment device for the vanes 6 and 8 and the air regulating flap 4 are arranged. Parts of the manipulator 10, the coupling member 11 and the coupling rod 15 are thus arranged in the separation element.

The movable parts of the air vent 1, that is to say in particular the air regulating flap 4, the first vanes 6, the second vanes 8, the manipulator 10, the coupling member 11, the coupling rod 15, the lever arms 16, 17, the vane shafts 18, 19, the coupling elements 20, 21, the lever arms 24, 27, and the pins 23, 26 can be injection-moulded parts made of thermoplastic materials.

With the above-described adjustment means for the air regulating flap 4, the first vanes 6 and the second vanes 8, the directional characteristics of an exiting airflow in a vertical and horizontal direction can be changed by means of an individual manipulator 10.

As indicated above, the air vent 1 can be used in particular in a vehicle interior. The invention therefore also proposes a vehicle interior trim part which comprises an air vent 1 as described above.

LIST OF REFERENCE SIGNS

1 air vent
2 first air channel
3 second air channel
4 air regulating flap
5 flap axis
6 first vane
7 first vane axis
8 second vane
9 second vane axis
10 manipulator
11 coupling member
12 first end of the coupling member
13 intermediate piece of the coupling member
14 second end of the coupling member
15 coupling rod
16 lever arm
17 lever arm
18 first vane shaft
19 second vane shaft
20 coupling element
21 coupling element
22 guide groove
23 pin
24 lever arm
25 guide groove
26 pin
27 lever arm
28 manipulator axis
29 air inlet opening
30 separation element
31 vane
32 vane
33 housing
34 horizontal direction
35 lateral fixing
36 recess
37 rod

The invention claimed is:

1. An air vent, comprising
a first air channel,
a second air channel,
an air regulating flap pivotable around a flap axis for adjusting a ratio between a first airflow through the first air channel and a second airflow through the second air channel, wherein the air regulating flap closes the first air channel in a first position and the air regulating flap closes the second air channel in a second position, wherein the first air channel and the second air channel are shaped and/or arranged such that the first airflow and the second airflow, after passing through the air vent, collide and form an exiting airflow, wherein adjusting the ratio between the first airflow and the second airflow changes a direction of the exiting airflow,
a plurality of first vanes that are disposed at least partially in the first air channel, wherein each of the first vanes is pivotable around a first vane axis,
a plurality of second vanes that are disposed at least partially in the second air channel, wherein each of the second vanes is pivotable around a second vane axis, and
a manipulator coupled to the first vanes, the second vanes and the air regulating flap for adjusting the first vanes, the second vanes and the air regulating flap,
wherein the first air channel and the second air channel are of different lengths.

2. The air vent according to claim 1, further comprising a coupling member, which connects the first vanes and the second vanes to the manipulator, wherein a first end of the coupling member is connected to the first vanes, an intermediate piece of the coupling member is connected to the second vanes, and a second end of the coupling member opposite the first end is connected to the manipulator.

3. The air vent according to claim 1, further comprising a coupling rod, which is arranged between the manipulator and the air regulating flap and is connected thereto.

4. The air vent according to claim 3, further comprising a first lever arm and a second lever arm, wherein the first lever arm is rigidly coupled to the air regulating flap and is coupled articulatedly to the coupling rod, wherein the second lever arm is rigidly connected to the manipulator and is coupled articulatedly to the coupling rod.

5. The air vent according to claim 1, wherein the first vane axes and the second vane axes are parallel to one another.

6. The air vent according to claim 1, wherein the first vane axes lie in a first plane and the second vane axes lie in a second plane, wherein the first plane and the second plane are different from one another.

7. The air vent according to claim 1, wherein the first vanes are arranged closer than the second vanes to the air regulating flap.

8. The air vent according to claim 1, wherein the first air channel and the second air channel are connected to an air inlet opening, wherein the first vanes are arranged closer to the air inlet opening than the second vanes.

9. An air vent according to claim 1, in combination with a vehicle interior trim part.

* * * * *